United States Patent Office 3,203,245
Patented Aug. 31, 1965

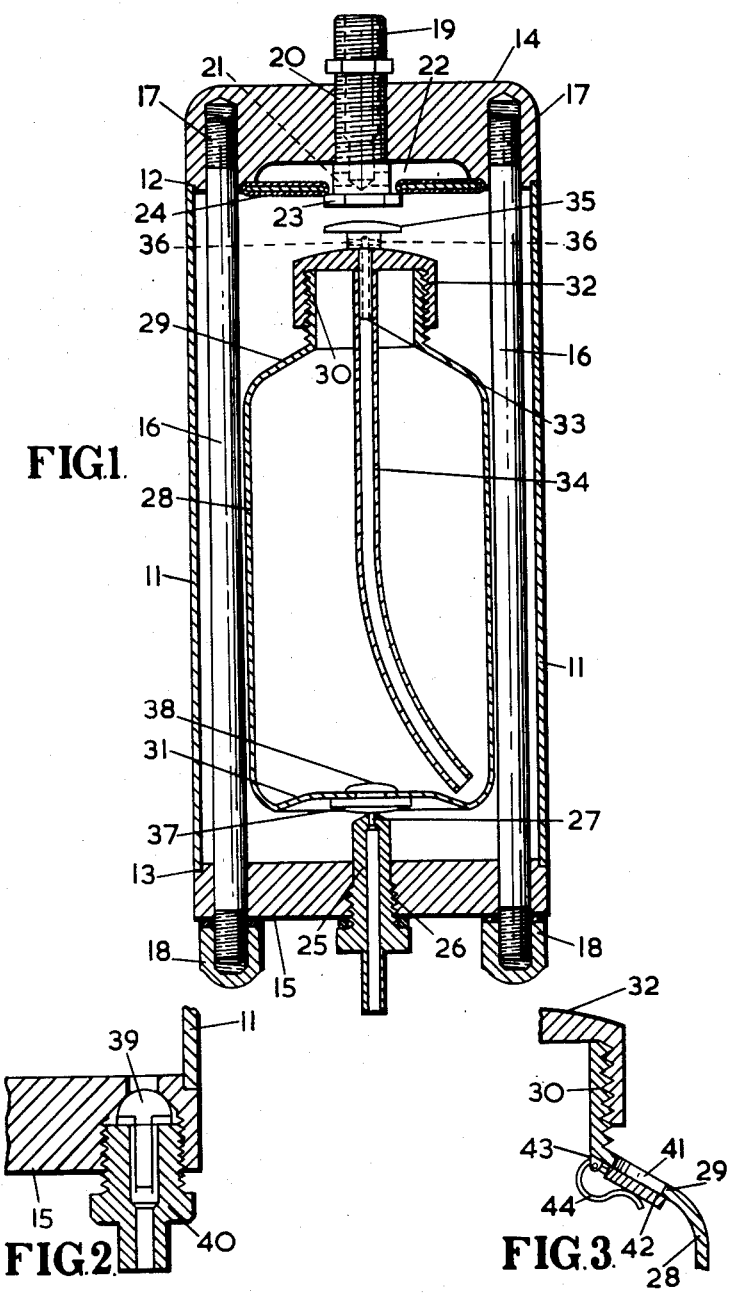

3,203,245
FLOAT FOR USE IN A PRESSURIZED CHAMBER
Cosby Donald Philipps Smallpeice, "Caribbee," Riddell's Bay, Bermuda, assignor of one-half to Nuquip Limited, Richmond, Surrey, England
Filed Feb. 9, 1962, Ser. No. 172,220
Claims priority, application Great Britain, Feb. 28, 1961, 7,212/61
2 Claims. (Cl. 73—322.5)

The invention relates to a float for use in a pressurised chamber (e.g., to operate a drain valve to drain a liquid from a chamber containing a gas under pressure, for example, for draining condensate from a steam or compressed air system).

Hitherto such a float has been connected to operate a movable valve member through a lever mechanism, as is has not been found practicable to operate the valve directly by the float, particularly in high pressure systems, because the float has to be strong enough to resist the pressure in the chamber in which it operates, and when made strong enough for that purpose it has insufficient bouyancy to open the valve.

The principal object of the invention, therefore, is to provide a float which is of light weight but not liable to collapse under the gas pressure in which it operates.

According to this invention the float is hollow, thin-walled, and resiliently distortable and it has its interior vented to the chamber in a position above the level of the liquid in the latter which floats it, such that the gas pressure inside the float is at least approximately equal to the gas pressure outside it and within the chamber. The float can itself constitute a movable valve member, or directly support it; and it will be seen that the float can be of extremely weak construction, for example, it can be made of thin plastic material of negligible weight and maximum buoyancy.

In the case where the float itself constitutes the movable valve member, it can, according to a further feature, be provided with a small reinforced area for coaction with the valve port.

In some instances there could be a tendency for liquid, in the chamber, in course of time to enter the float through the vent and thus cause loss of buoyancy. To rectify this, and according to a still further feature, the vent is at the top of a tube of which the bottom reaches nearly to the obttom of the inside of the float, the top of the tube preferably being shrouded against the direct ingress of liquid (e.g., bent over in inverted U shape). In this way the normal slight drops which occur in the gas pressure in the chamber during normal use will result in the pressure inside the float being temporarily somewhat above that in the chamber, and this causes any liquid which has collected inside the float to be forced through the tube and out into the chamber, thus restoring the buoyancy of the float.

It can be arranged for the float to be free to move slightly when afloat in the chamber, and also to rotate, and this helps to remove any dirt which may collect in the port.

If the float is made of semi-flexible thin material such as a plastic bottle, a sudden rise in the pressure in the chamber may cause it to collapse; but it will recover its shape again when the pressure inside it equals that in the chamber. This is not detrimental under normal conditions but can, according to yet another feature, be avoided by providing an additional, and large vent, in the top of the float, normally closed by a flap valve which will open to allow the pressure to enter the float more quickly. Alternatively, or additionally, the bottle can be made to be resiliently distorable in the event of a sudden rise in the superincumbent pressure, its resilience causing, or accelerating the recovery of the float to its normal shape when the pressures acting on its inner and outer surfaces are again at least substantially balanced.

Conveniently the float is in the form of a ball or bottle, and for maintaining it in the required attitude it may be provided with a keel diametrically opposite the vent, or, according to a further feature, use could be made of guides for the same purpose.

The invention is illustrated by the accompanying drawings, in which:

FIGURE 1 is a longitudinal section through a drain valve incorporating one form of float;

FIGURE 2 is a detail of a connection in the bottom wall of the drain valve; and

FIGURE 3 is a fragment of a similar view illustrating a modification.

The drain valve of FIGURE 1 has a body comprising a thin, cylindrical wall 11 having its ends spigotally engaged at 12 and 13 with respective end walls 14 and 15, and these parts are held in assembled relationship by a plurality of tie rods 16 of which only two are shown. These tie rods are parallel to each other and are arranged in a circle which is coaxial with, and within the wall 11. At their upper ends the tie rods have a screw-threaded engagement 17 with end wall 14, and at their lower ends they extend through holes in end wall 15 to receive clamping nuts 18.

A union 19 extends coaxially through end wall 14, having a screw-threaded engagement therewith at 20, and its hollow interior communicates with the interior of the body through a ring of radical ports 21. These ports are within a recess 22 in the inner end of wall 14, and the rim of the recess, and a head 23 of the union locate an annular filter 24 in position. The union serves as a connection to a pipe (not shown) carrying a wet gas, and the radial ports 21 deliver it over the surface of the filter so that the latter can hold back solid particles which may be entrained in the gas.

A drain outlet union 25 extends coaxially through end wall 15, having a screw-threaded engagement therewith at 26, and its upper end terminates in a drain valve seat which has a central orifice 27 communicating with its hollow interior and coacts with the float as hereinafter described.

The float is somewhat of bottle shape, and comprises a thin cylindrical wall 28 merging at the top into a shoulder 29 and neck 30, and at the bottom into a bottom wall 31 which is dished as shown. The neck of the bottle is provided with a screw-cap 32 through which coaxially extends a hollow stem 33 engaged in the bore of a tube 34 having its open lower end in the circular trough formed by the dishing of bottom wall 31, but just clear of the latter. At its upper end the stem 33 is integral with a head 35 which shrouds a ring of radial ports 36 establishing a communication between the interior of the drain valve body and the interior of the float and acting as the aforesaid vent. Centrally of its bottom wall 31 the float carries a movable valve member 37 for coaction with the central orifice 27 of the drain valve seat. As shown, the movable valve member 37 is secured to the float wall 31, for example, by a stem which extends through the latter from the outside and is peened over at 38.

The spacing between the tie rods 16 and the float wall 28 is such that the tie rods will guide the float during vertical movement of the latter and preserve alignment of the movable valve member 37 and orifice 27.

In operation the liquid suspended in the gas, or otherwise entering union 19, or afterwards condensing therefrom, will settle in the bottom of the drain valve body, and as it accumulates the float will rise, lifting movable valve member 37 off drain valve orifice 27. This allows the gas pressure in the said body to discharge the accumulated liquid through the drain outlet union 25 until the level of the liquid falls to that of the orifice 27.

At the same time ports 36 communicate the gas pressure in the body to the inside of the float so that the walls of the latter are at least substantially pressure balanced and thereby protected against being collapsed by the pressure of the gas surrounding the float. This permits the float walls to be made very thin, and of a light material (e.g., of metal or a plastic) so as to invest the float with optimum buoyancy.

The provision of the head 35, coupled with the fact that the ports 36 are directed radially, militates against liquid suspended in the gas delivered through union 19 from directly entering the float. If this should occur, or if moisture condenses in the float, the liquid will accumulate in the annular trough formed by the dishing of the bottom wall 31 of the float. When such liquid will have accumulated to the extent that the open bottom end of the tube 34 is submerged, it will be discharged up the said tube and into the drain valve body whenever the pressure in the latter falls below that in the float.

As operation of the drain valve will leave liquid in the body up to the level of the orifice 27, and it will be necessary to clear it out from time to time, the bottom wall 15, as shown in FIGURE 2, is provided with a port having an internal seat against which a stop valve member 39 is normally held by a manually-operable screw-threaded union 40.

If for some reason, in a particular application, there is a risk that the pressure in the body should rise at such a rate that the ports 36 cannot immediately communicate the pressure rise to the interior of the float, thus giving rise to conditions in which the float, being of low strength, could be collapsed, the additional provision of FIGURE 3 can be made. In that figure the shoulder 29 of the float is provided with a relatively large inlet opening 41 which is normally closed by a flap valve member 42 within the float. The member 42 is pivoted from a bracket 43 and biased into its normally closed position by a spring 44. Thus, on a sudden rise in pressure outside the float, valve member 42 will be opened by the external pressure to accelerate the pressure balancing.

While a specific application of one form of float, according to the invention, to a drain valve has been described it will readily be appreciated that floats in accordance with the invention could be applied to any other use where a buoyant float, protected against the danger of collapse by a superincumbent pressure, is required.

What I claim as my invention and desire to secure by Letters Patent of the United States is:

1. A float for use in a pressurised gas chamber in which a liquid can collect, said float being hollow and made from thin sheet material to provide it with a high degree of buoyancy in the liquid, said float having a vent adjacent its top to establish a permanent communication between its interior and the interior of the chamber to enable the gas pressures existing in said float and said chamber to equalise, and the thin sheet material from which said float is made being highly flexible and resilient so that said float can be partially collapsed by a sudden preponderance of gas pressure in said chamber over the gas pressure in said float while the said preponderance of gas pressure is being relieved by the passage of gas through the vent and into the float, and afterwards recover its original shape by virture of its resilience.

2. A float according to claim 1 comprising a pipe within the float, said pipe having an upper end communicating with the vent, and said pipe having a lower end adjacent the bottom of said float so that liquid accumulated in the latter will be exhausted through said pipe and the vent whenever the gas pressure in the chamber falls below the gas pressure in the float.

References Cited by the Examiner

UNITED STATES PATENTS

| | | | |
|---|---|---|---|
| 863,623 | 8/07 | Mower | 73—322.5 |
| 1,120,070 | 12/14 | Lytton | 73—322.5 |
| 1,334,821 | 3/20 | Turnbull | 137—192 X |
| 1,642,023 | 9/27 | Haight | 137—192 |
| 1,732,222 | 10/29 | Centrall | 137—433 |
| 1,960,304 | 5/34 | Eastman | 73—322.5 X |
| 2,083,629 | 6/37 | Zimmerer | 137—202 X |
| 2,087,913 | 7/37 | Kenney | 73—322.5 X |
| 2,394,437 | 2/46 | Freeman | 73—322.5 X |
| 2,962,042 | 11/60 | Snider | 137—433 X |
| 2,979,070 | 4/61 | Payne | 137—192 |

ISAAC LISANN, *Primary Examiner.*

I. WEIL, ROBERT B. HULL, ROBERT L. EVANS,
*Examiners.*